United States Patent
Zothke et al.

(10) Patent No.: US 8,251,396 B2
(45) Date of Patent: Aug. 28, 2012

(54) AIRBAG MODULE ARRANGEMENT

(75) Inventors: Nils Zothke, Lehre (DE); Karl-Heinz Pauly, Leiferde (DE)

(73) Assignee: Volkswagen AG, Wolfsburg (DE)

( * ) Notice: Subject to any disclaimer, the term of this patent is extended or adjusted under 35 U.S.C. 154(b) by 53 days.

(21) Appl. No.: 12/667,097

(22) PCT Filed: May 28, 2008

(86) PCT No.: PCT/EP2008/004105
§ 371 (c)(1),
(2), (4) Date: Apr. 30, 2010

(87) PCT Pub. No.: WO2009/003558
PCT Pub. Date: Jan. 8, 2009

(65) Prior Publication Data
US 2010/0276913 A1    Nov. 4, 2010

(30) Foreign Application Priority Data
Jun. 29, 2007   (DE) .................. 10 2007 030 372

(51) Int. Cl.
*B60R 21/207*   (2006.01)
*B60R 21/201*   (2011.01)
(52) U.S. Cl. ................... 280/728.2; 280/730.2
(58) Field of Classification Search ............. 280/728.2, 280/728.3, 730.2
See application file for complete search history.

(56) References Cited

U.S. PATENT DOCUMENTS

| | | | |
|---|---|---|---|
| 5,698,283 A | | 12/1997 | Yamasaki et al. |
| 5,779,263 A | * | 7/1998 | Lane et al. .......... 280/730.2 |
| 5,839,752 A | | 11/1998 | Yamasaki et al. |
| 5,890,734 A | * | 4/1999 | Saderholm ............ 280/730.2 |
| 6,453,535 B1 | * | 9/2002 | Nicholas .................. 29/413 |
| 7,384,062 B2 | * | 6/2008 | Yokoyama et al. ....... 280/730.2 |
| 7,562,902 B2 | * | 7/2009 | Osterhout ............... 280/730.2 |
| 2005/0161927 A1 | * | 7/2005 | Yokoyama et al. ....... 280/743.1 |

(Continued)

FOREIGN PATENT DOCUMENTS

DE    100 41 760    3/2001
(Continued)

OTHER PUBLICATIONS

International Search Report and Written Opinion of the International Searching Authority, PCT/EP2008/004105 dated Aug. 22, 2008 (translation provided).

(Continued)

*Primary Examiner* — Joseph Rocca
(74) *Attorney, Agent, or Firm* — Kenyon & Kenyon LLP (57) ABSTRACT

In an airbag module arrangement, an airbag module is arranged on a vehicle component, in particular a seatback, the airbag module including an airbag carrier, an airbag and a gas generator, which are jointly attached to a support structure in an installation space of the vehicle component, from which the airbag exits in the event of a triggering and subsequently opens at least one material layer situated over the airbag module and inflates in a passenger compartment, etc.

There is a provision for the installation space of the airbag module to be surrounded by a foam part that is closed at least in the direction of inflation, and a fleece-like layer to be situated on the inner side of foam part at least in the desired exit region of the airbag module from the foam part, which has a specifiable perforation in the desired exit region of the airbag module.

23 Claims, 8 Drawing Sheets

U.S. PATENT DOCUMENTS

| | | |
|---|---|---|
| 2006/0066078 A1 | 3/2006 | Hofmann |
| 2006/0113761 A1 | 6/2006 | Tracht |
| 2006/0113764 A1 | 6/2006 | Tracht |
| 2007/0085308 A1* | 4/2007 | Tracht et al. ............... 280/730.2 |

FOREIGN PATENT DOCUMENTS

| | | |
|---|---|---|
| DE | 696 27 578 | 2/2004 |
| DE | 696 27 259 | 4/2004 |
| DE | 699 07 172 | 4/2004 |
| DE | 10 2004 007 415 | 9/2005 |
| DE | 10 2004 051 663 | 4/2006 |
| DE | 10 2004 060 328 | 6/2006 |
| DE | 10 2005 057 438 | 6/2006 |
| DE | 10 2005 057 504 | 6/2006 |
| WO | WO 99/61222 | 12/1999 |

OTHER PUBLICATIONS

International Preliminary Report on Patentability, PCT Application No. PCT/EP2008/004105 dated Jan. 5, 2010 (translation provided).
Search Report, German Patent and Trademark Office, Application No. 10 2007 030 372.8, dated Nov. 20, 2008 (translation provided).

* cited by examiner

AIRBAG MODULE ARRANGEMENT

FIELD OF THE INVENTION

The present invention relates to the arrangement of a soft cover lateral impact airbag module on a vehicle component, in particular a backrest of a vehicle seat.

BACKGROUND INFORMATION

In the non-inflated state, airbags must be as small as possible and accommodated securely within the interior equipment of the vehicle, for example in dashboards, impact absorbers or side trim panels as well as in vehicle seats.

Today's vehicles are often equipped with lateral impact airbags, which may have the form of a lateral air curtain situated in a vehicle roof; or, alternatively or additionally, an airbag may be situated within a vehicle seat system.

One disadvantage of airbags that are located within a seat system is that the airbags must break through the seat material before they are able to inflate completely so as to protect a vehicle occupant. During the inflation, such an airbag may strike foam or other seat cushion materials and must then break through the seat cover in order to be able to exit the seat system. Here there is a problem of preventing the lateral region from being "shot through" in an uncontrolled manner and of avoiding the creation of individual foam particles when firing the airbag in order to protect the occupants.

A disadvantage is the fact that the hard cover structure of the airbag module that is used in most cases forms externally visible elevated upholstery regions after the vehicle seat has been "broken in" because of minimal changes in the foam part, for example in an open foam region developed laterally in the back rest.

Aside from the so-called hard cover airbag modules, however, so-called soft cover airbag modules are known as well.

The installation in the specified installation spaces is difficult because the task is one of accommodating an airbag that is folded only loosely, while at the same time ensuring a secure inflation. Since the folding of an airbag is important with regard to the type and reliability as well as the speed of inflation, the folded airbag is held by retaining straps or a so-called soft cover in the folded position during transport and installation until inflation occurs by the gas of a gas generator.

SUMMARY

Example embodiments of the present invention provide an arrangement of a soft cover airbag module that avoids the mentioned disadvantages and overcomes the mentioned difficulties.

Example embodiments of the present invention accommodate a soft cover airbag module in a vehicle seat such that no visible regions are formed by the airbag module during the lifetime of the vehicle seat through changes to the seat from outside and that additionally a reliable inflation and exit of the airbag is ensured.

Example embodiments of the present invention provide that an installation space of the airbag module in a vehicle component, in particular a back rest, is surrounded by at least one material layer comprising a foam part and a fleece layer, the foam part being closed at least in the direction of inflation and the fleece-like layer being situated at least in the desired exit region of the airbag module from the foam part on the inner side of the foam part, which has a specifiable perforation in the desired exit region of the airbag module.

The airbag module may include a soft cover lateral impact airbag module, the airbag of which is fastened on the airbag carrier by a retaining strap, etc., and is kept in an installation space provided in the foam part.

The perforation may be implemented on the inner side of the fleece-like layer in the direction toward the airbag module.

The fleece-like layer may be already foamed onto the foam part when foaming the foam part in a foam part tool.

In an exemplary embodiment of a vehicle seat, the perforation of the fleece-like layer is implemented as extending substantially in the z direction substantially orthogonally to the inflation direction of the airbag of the airbag module.

The perforation of the fleece-like layer achieves a specific tearing of the back rest foam in the event that the lateral impact airbag is triggered.

The perforation of the fleece-like layer may be slotted, hole-perforated, etc. The slotting or hole-perforation of the fleece-like layer is performed according to a specifiable slot or hole pattern. The fleece-like layer yields the advantage that the fleece-like layer firmly holds the foam of the foam part together in the exit region of the airbag of the airbag module, while preventing the formation of individual foam particles of the foam.

A slot or hole pattern may be formed, in which the length of the slotted or hole-perforated regions of the fleece-like layer increases from top to bottom in a perforation extending (vertically) in the z direction.

Furthermore, a slot or hole pattern may be formed, in which the spaces between the slotted or hole-perforated regions of the fleece-like layer decrease from top to bottom in a perforation extending (vertically) in the z direction. The foam part may also have a slotted or pre-slotted segment on the inner side in the direction of the airbag module, the position of the slotted or pre-slotted segment being adjusted to or corresponding to the perforation of the fleece-like layer.

The foam part may additionally be provided with a foam groove on the inner side of the foam part, which allows for a defined tearing of the foam part when the airbag of the airbag module exits in a specifiable direction.

The foam groove may be introduced on the inner side into the foam part in a crescent-like shape and oriented in the specifiable direction, depending on the desired direction of inflation. For protecting a vehicle occupant laterally, in particular for protecting the hip region of an occupant, an inflation direction at an angle forward between the x, y directions is desired for example, the foam groove furthermore being introduced, e.g., extending at an angle across from an imaginary y plane. To allow for this direction of inflation, the foam groove is introduced in accordance with these specifications, as the figures additionally illustrate and as the subsequent exemplary embodiment describes in more detail.

A cover surrounding the foam part may have a weakening, the position of the weakening being adjusted to or corresponding to the perforation of the fleece-like layer.

Finally, the perforation may be implemented in the transition region of the foam part as extending substantially in the z direction from a planar inner contour extending substantially in the x direction to the planar inner contour of the foam part extending substantially in the y direction such that a direction of inflation develops at an angle forward substantially in the x direction between the x, y directions for the lateral protection of a vehicle occupant.

Example embodiments of the present invention are explained in more detail below with reference to the appended figures. The present invention is not limited to the exemplary embodiment. Explicit reference is made to the fact that a use is possible in any region of a vehicle seat or other regions of the vehicle, for example in a dashboard, etc., even if the subsequent description only refers to an airbag module arrangement as a lateral impact module in a backrest.

DETAILED DESCRIPTION

Figure 1:
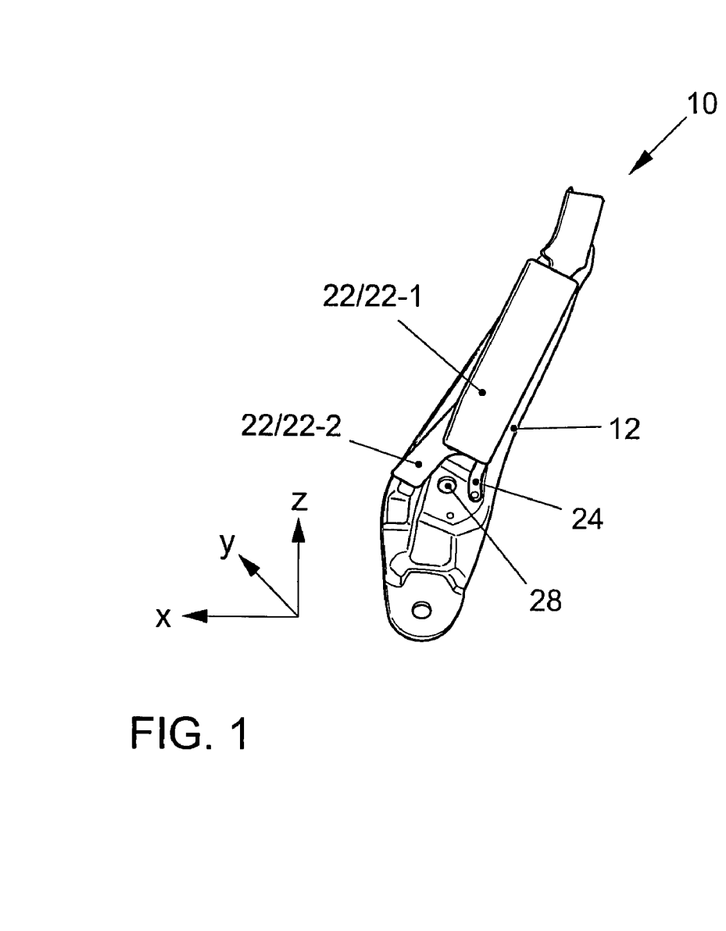
FIG. 1 is a lateral view of a support structure supporting a soft cover airbag module in the example of a backrest.

FIG. 1 shows a lateral view of a support structure 12 supporting a soft cover airbag module 22 in the example of a backrest 10. Backrest 10 is the vehicle component with reference to which example embodiments of the present invention are to be explained in greater detail.

FIG. 1 shows a soft cover airbag module in the embodiment as a soft cover airbag lateral module 22 in two designs: one design according to the soft cover airbag lateral module 22-1 variant and another design according to the soft cover airbag lateral module 22-2 variant. In the second variant, the soft cover airbag lateral module is drawn out further downward by an extended component. Soft cover airbag lateral modules 22 are connected to support structure 12 of the backrest via a fastening device 24. To show the relative size, an opening 28 is visible in the support structure 12 of the backrest, in which an operating element for a lumbar adjustment device 26 is situated. Soft cover airbag lateral module 22 substantially covers a central third in relation to the length of backrest 10.

Figure 2:
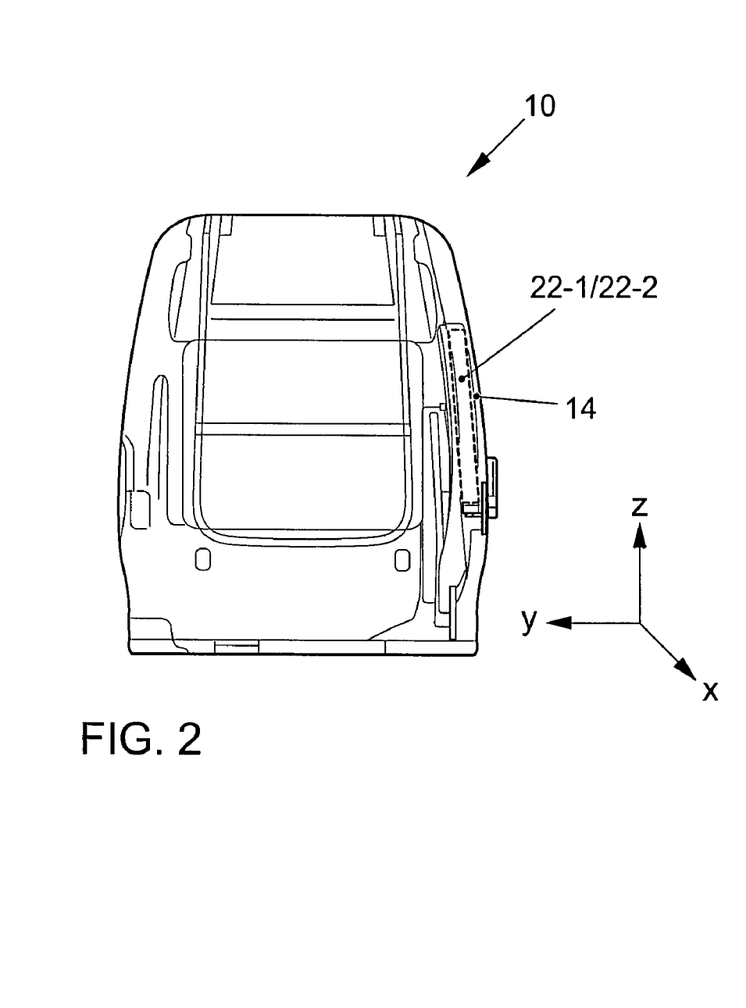
FIG. 2 is a front external view of the backrest having a laterally disposed airbag module arrangement.

The front external view of the backrest in FIG. 2 shows that the soft cover airbag lateral module is situated between support structure 12 and the foam of a backrest cushion. The operating element of lumbar adjustment device 26 is flush with the lower region of soft cover airbag lateral module 22-1/22-2.

Figures 3A, 3B:
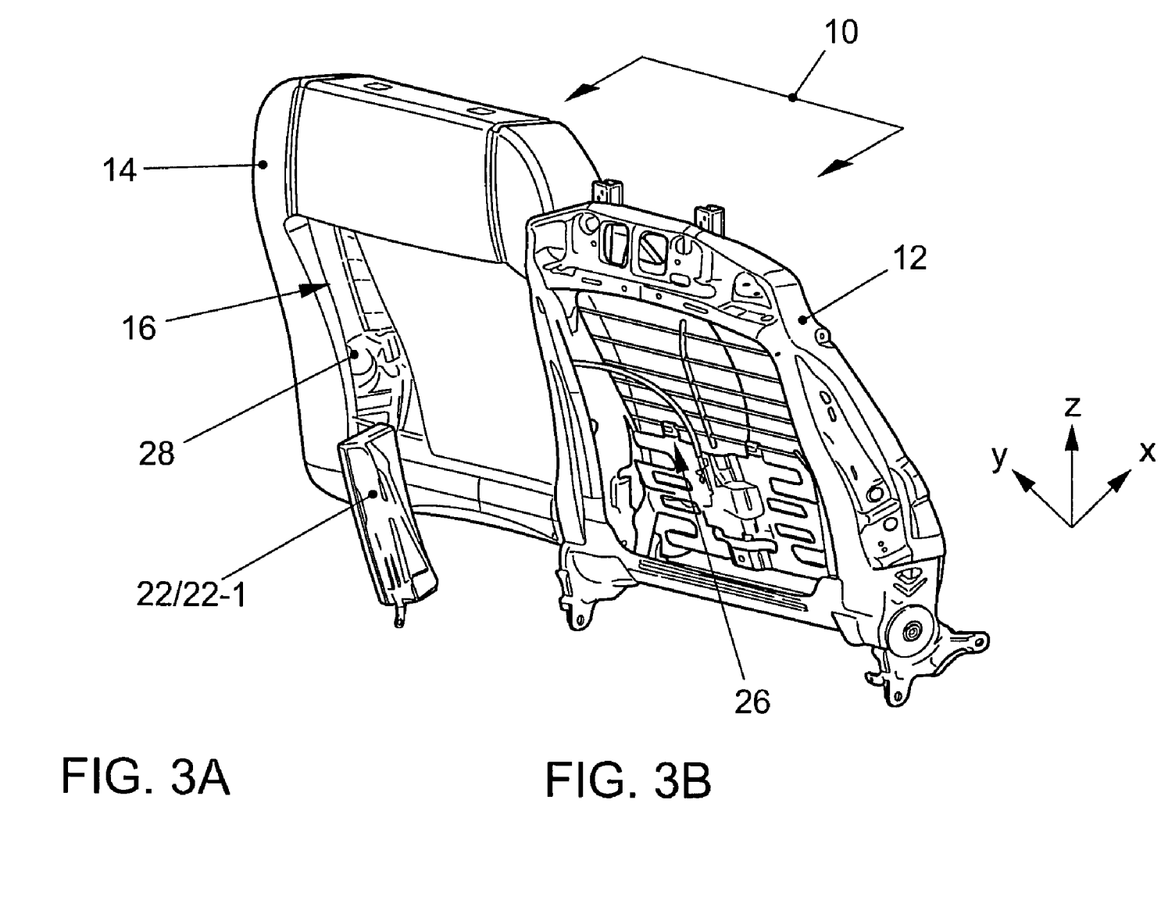
FIG. 3A is a perspective rear view into the open foam part of a backrest with the soft cover airbag module pulled out.
FIG. 3B illustrates the associated support structure of the backrest.

In a perspective rear view, FIG. 3 shows an open foam part 14, which surrounds support structure 12 of backrest 10, soft cover airbag lateral module 22 being shown in a pulled-out state. An installation space 16 is provided in foam part 14 in this region of foam part 14. FIG. 3A additionally shows opening 28 provided for an operating element of lumbar adjustment device 26, which is shown in FIG. 3B as being fastened in support structure 12 of backrest 10.

Figure 4:
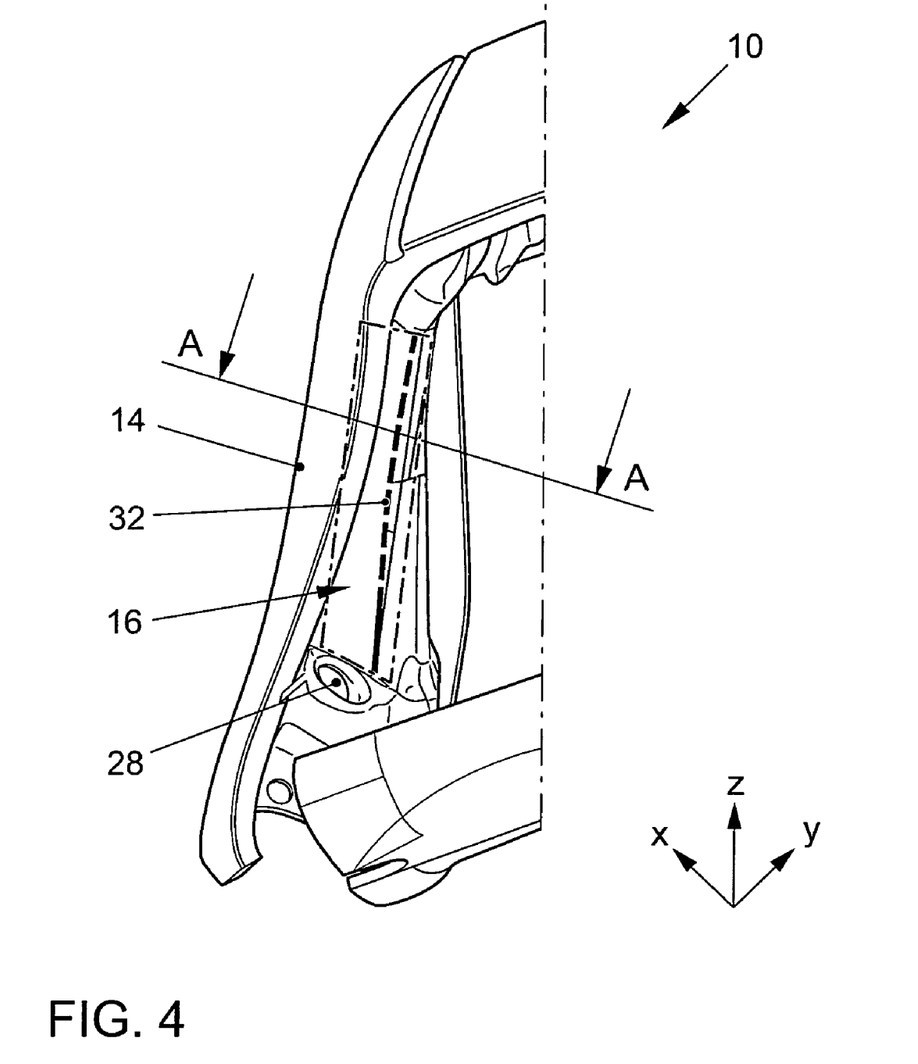
FIG. 4 is a schematic perspective view of an open backrest at an angle from the rear with an indication of a sectional line A-A through the foam part of the backrest.

FIG. 4 shows installation space 16 in open backrest 10 in a schematic perspective view at an angle from the rear. The position of sectional line A-A through foam part 14 of backrest 10 is likewise indicated, section A-A being shown in detail in FIGS. 6A, 6B.

Figure 6A:
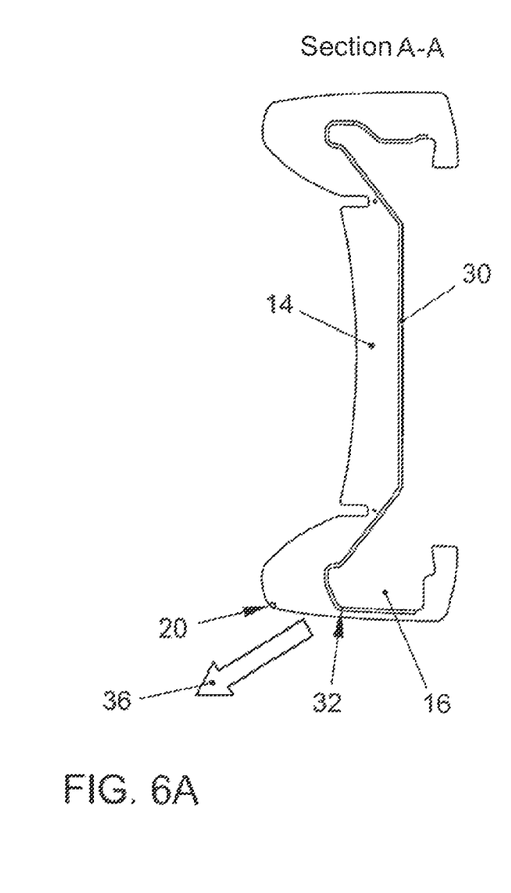
FIG. 6A illustrates section A-A from FIG. 4 or 5 of the foam part having a fleece-like layer situated on it.
Figure 6B:
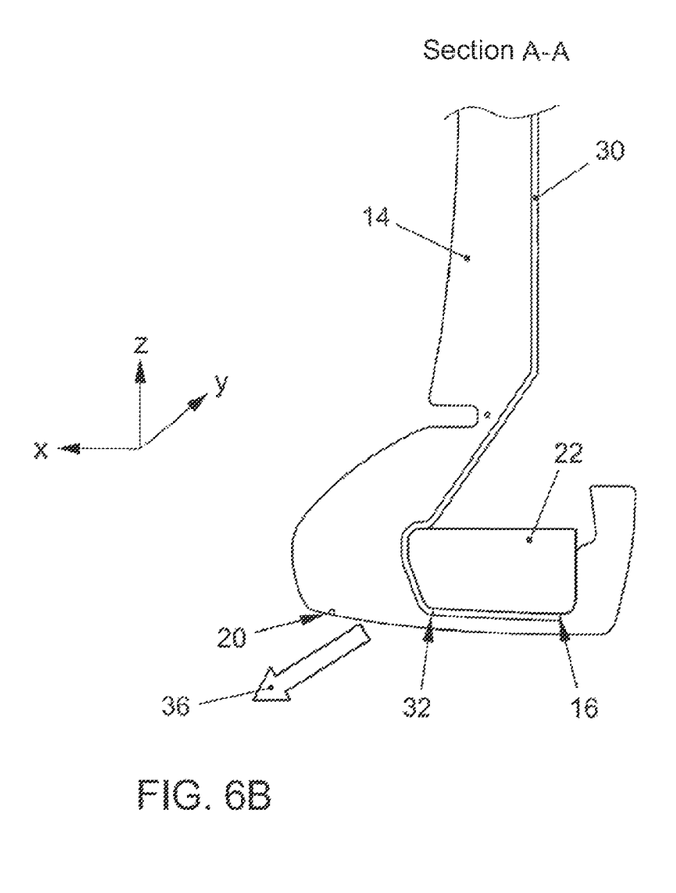
FIG. 6B is an enlarged view of FIG. 6A of the lower region of section A-A from FIG. 4 or 5 of the foam part.

FIGS. 4 and 6B in particular show the installation space requirement 16 of soft cover airbag lateral module 22 in foam part 14.

Figure 5:
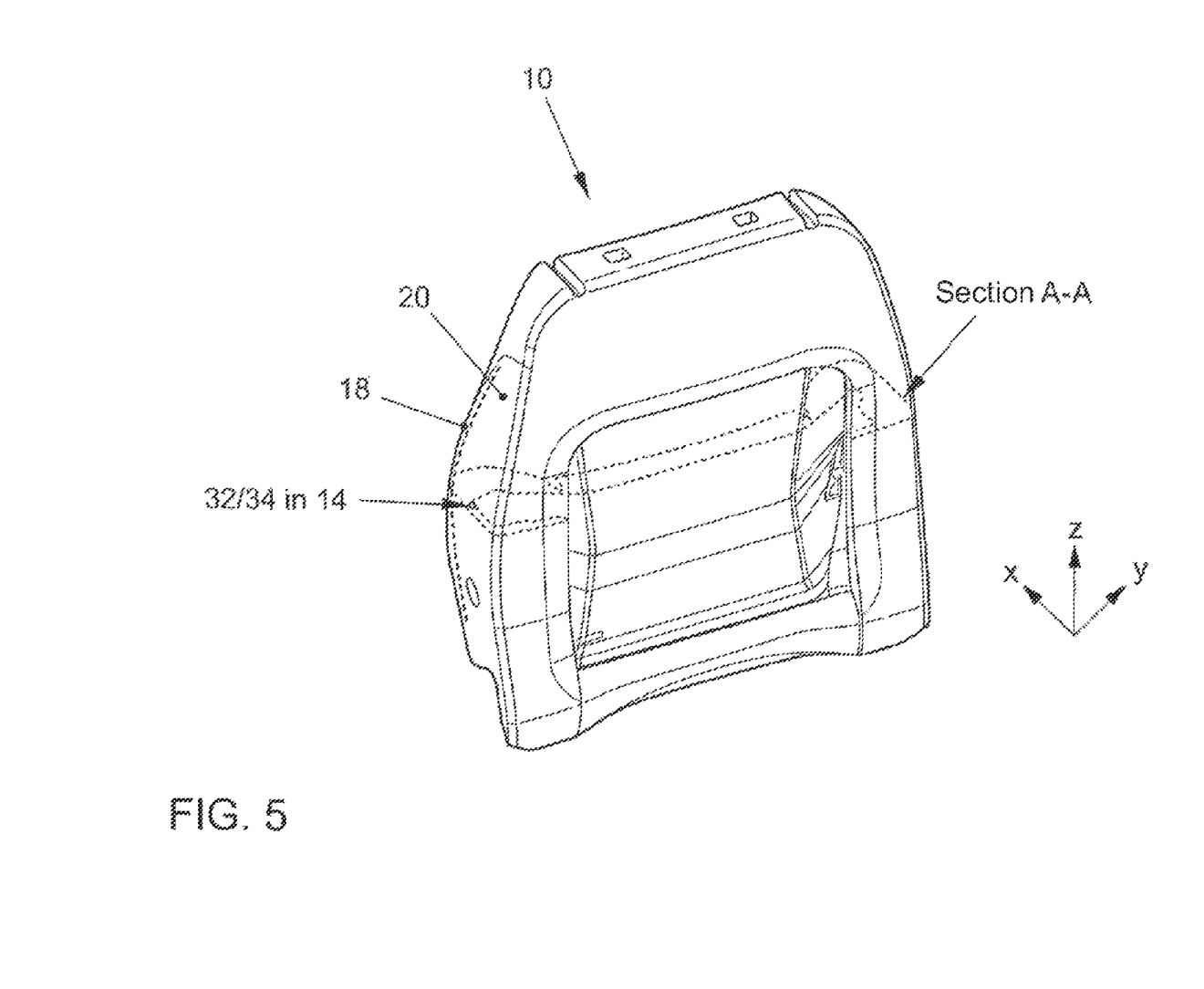
FIG. 5 is a schematic perspective view of a closed backrest at an angle from the rear with an indication of the sectional line A-A through the foam part of the backrest.

The position of sectional line A-A is likewise shown in FIG. 5, a backrest 10 being shown here in a perspective view of a closed backrest 10 at an angle from the rear. This external view shows that foam part 14 of backrest 10 is surrounded by a cover 18, which has a weakening 20 in the region of soft cover airbag lateral module 22.

Corresponding to this weakening 20 or at least matched in its position, foam part 14 has a perforation 32, which is not introduced into foam part 14 itself however, but is rather introduced into a fleece or a fleece-like layer 30. Fleece-like layer 30 may be foamed on or applied in another manner on foam part 14, for example by bonding, etc.

As FIGS. 6A and 6B show in section A-A, the fleece or fleece-like layer 30 is situated on the backside of the foam part. It is possible to situate the fleece or fleece-like layer 30 on the entire rear area of foam part 14 or to provide it only partially in the region of soft cover airbag lateral module 22 on the lateral inner side of foam part 14.

What is shown is the full-surface arrangement on the backside of foam part 14, it being possible for the fleece or fleece-like layer 30 to be introduced into the foaming tool already during the foaming of foam part 14 such that a compact foam part having a mounted fleece 14, 30 is obtained. Preferably, the fleece or fleece-like layer 30 is perforated already prior to foaming.

Figure 7:
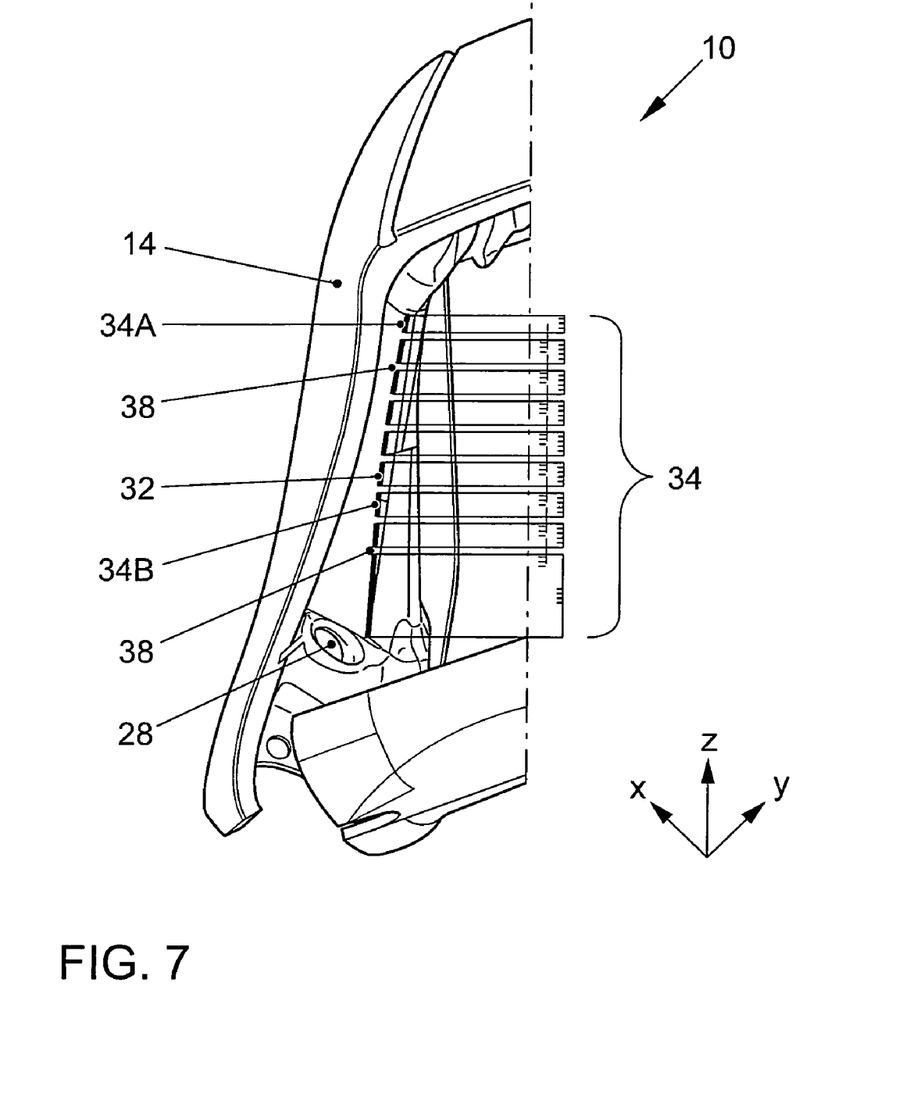
FIG. 7 is a schematic perspective view of an open backrest at an angle from the rear including a representation of the perforation of the fleece-like layer.

The pattern of the perforation may be gathered especially from FIGS. 6A, 6B and FIG. 7.

Moreover, perforation 32 may be provided in the transition region of foam part 14 from an inner contour extending substantially in the x direction to an inner contour of foam part 14 extending substantially in the y direction such that a direction of inflation 36 is directed at an angle forward in the x direction between the x, y directions for the lateral protection of a vehicle occupant. Other directions of inflation 36 are possible.

FIGS. 6A, 6B in combination with FIG. 5 show that weakening 20, extending for example through an airbag seam in cover 18 likewise in the z direction, in this exemplary embodiment extends substantially in the front region of the lateral part of backrest 10, in which perforation 32 of the fleece or fleece-like layer 30 is provided as well on the inner side of foam part 14.

This approach allows for the airbag of soft cover airbag lateral module 22 to shoot through while preventing as much as possible foam particles from forming when the airbag is fired. The foam particles, which could possibly still detach from foam 14, are advantageously bound by the fleece or fleece-like layer 30.

FIG. 7 shows a schematic perspective view of an open backrest 10 at an angle from the rear including a view of perforation 32 of fleece-like layer 30 itself. It is disposed for example in the position described in FIGS. 6A and 6B and is implemented in Figure as perforation 32 in the manner of a slotted segment 34. All possible shapes and designs of perforations 32 are theoretically possible.

Thus, a precisely prescribed number of slots 34A, 34B is introduced, which were previously laid out in a kind of slot or hole pattern with respect to a specific distance 38 to one another and respectively having a predetermined length.

An example embodiment is explained in greater detail in exemplary fashion with reference to FIG. 7.

A slot or hole pattern is formed in which the length of the slotted or hole-perforated regions of fleece-like layer 30 increases from top to bottom in a perforation 32 extending (vertically) in the z direction. By contrast, distances 38 between the slotted or hole-perforated regions of fleece-like layer 30 decrease from top to bottom in a perforation 32 extending (vertically) in the z direction.

This ensures safe tearing properties of foam part 14, and, in the event of a triggering, fleece-like layer 30 substantially prevents the creation of individual foam particles.

The length of the short slots 34A or short hole-perforations of the slotted or hole-perforated regions in the upper region of fleece-like layer 30 may be, e.g., between 10 and 30 mm and the length of the long slots 34A or the long hole-perforations in the lower region of fleece-like layer 30 may be, e.g., between 30 and 50 mm.

The distance 38 between the slotted or hole-perforated regions of fleece-like layer 30 is, e.g., between 2 and 15 mm and decreases from top to bottom.

The foam part 14 may have a slotted or pre-slotted segment, the position of the slotted or pre-slotted segment being adjusted to or corresponding to perforation 32 of fleece-like layer 30 such that the above description and layout also applies to a slotting or perforation of foam part 14.

Individually and in combination, these measures have the effect that the airbag module exits from bottom to top since in the lower region, which represents approximately ⅔ of the total length, the longer slots 34B or hole-perforations are implemented at smaller distances 38. In the upper region, which represents approximately ⅓ of the total length of slotted segment 34 or hole-perforation, slots 34A are shorter and distances 38 are greater.

The length of slots 34 increases from top to bottom not necessarily linearly or distances 38 decrease non-linearly. A smaller length increase of the slotting or hole-perforation may be preferred in the upper region and a greater reduction of distances 38 in the upper region of the slotting or hole-perforation.

That is to say, in, e.g., the lower ⅔ region of the slotted segment or hole-perforation the length of the slots or hole-perforations increases to a greater degree and the distances 38 between the slots or hole-perforations decrease only a little in the lower ⅔ region.

Notwithstanding the resulting already very good and safe tearing properties of foam part 14, it is additionally possible to configure a foam groove 14A from the inner side of foam part 14 in foam part 14 without the formation of individual foam particles in the event of triggering. This foam groove 14A is shown in more detail in FIGS. 8A, 8B, 9A and 9B and produces in the location in which it is introduced an additional starting point or weakening point for a well-aimed tearing by the airbag of airbag module 22 at a specified location or in a specified region of seatback 10.

Figure 8A:
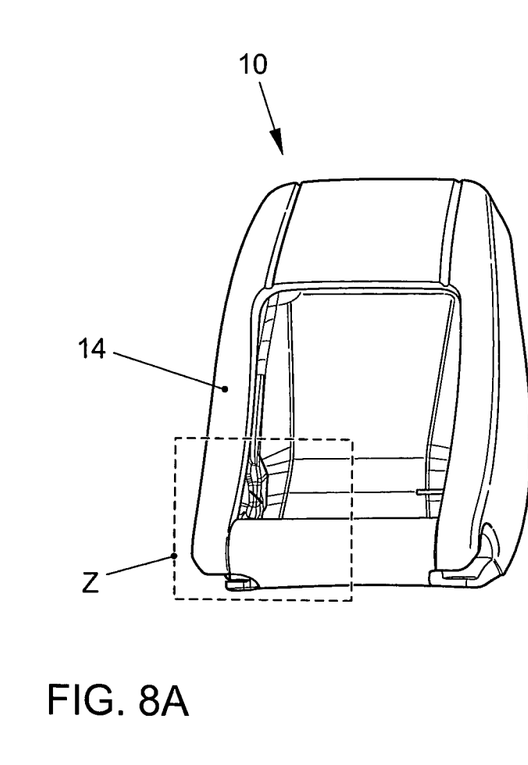
FIGS. 8A, 8B are views of an open backrest at an angle from the rear, in which the arrangement of a foam groove on the inside of the foam part is visible.
Figure 8B:
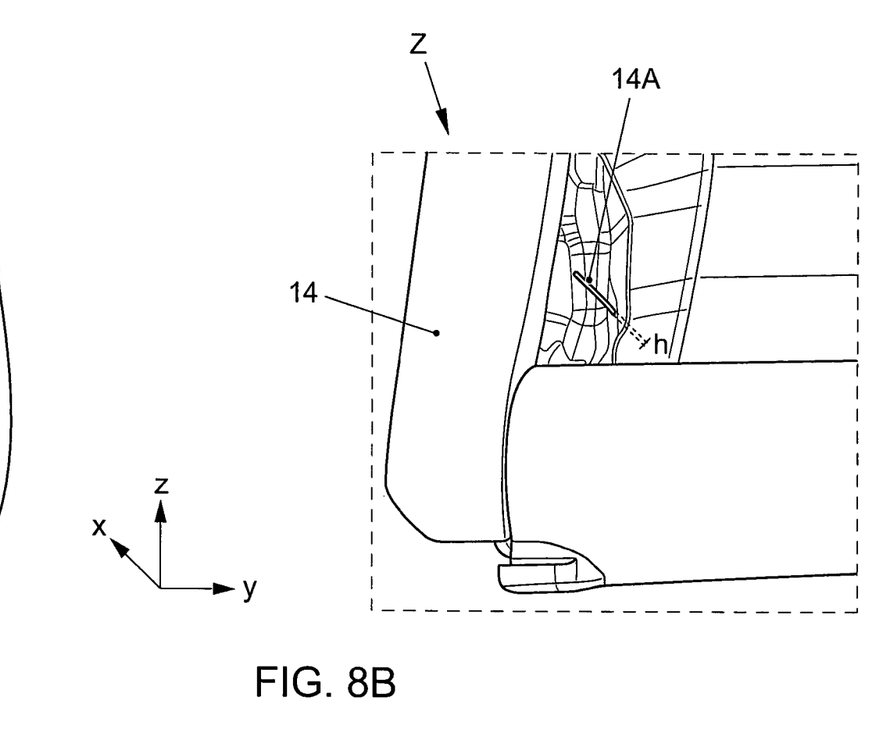

Foam groove 14A is introduced in a crescent-like manner into foam part 14 and is arranged or oriented in a specifiable direction, depending on the desired direction of inflation 36 in particular for the lateral protection of a vehicle occupant, in the direction of a hip region substantially at an angle toward the front in the x direction between the x, y directions.

FIG. 8A shows in detail Z the region of seatback 10, which is shown in an enlarged view in FIG. 8A.

FIG. 8B shows the position of foam groove 14A in foam part 14 in the view from the rear onto foam part 14 with a view into an open seatback 10. Foam groove 14A may be disposed in a specifiable position. In the exemplary embodiment, it is disposed extending at an angle across from an imaginary y plane. This arrangement ensures a tearing point with respect to the imaginary y plane in the z direction in the outer region of seatback 10 that is higher than a lower tearing point in the region of seatback 10 located further inward.

Figure 9A:
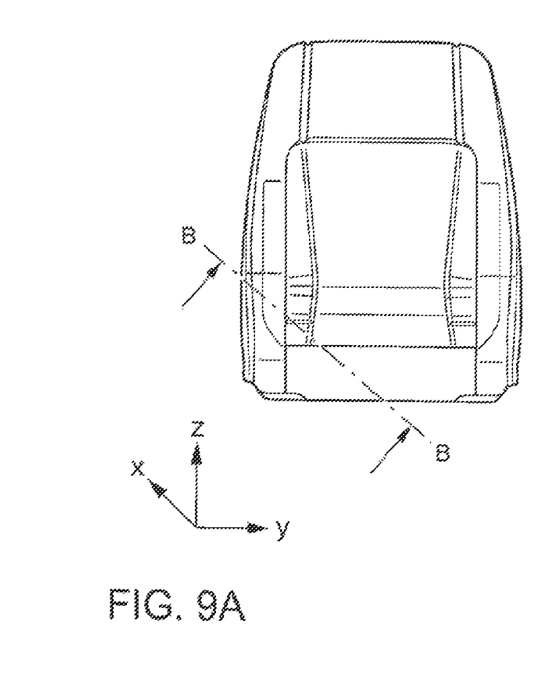
FIGS. 9A, 9B illustrate a section B-B from FIGS. 8A and 8B through the foam part for representing the position and shape of the foam groove in the foam part.
Figure 9B:
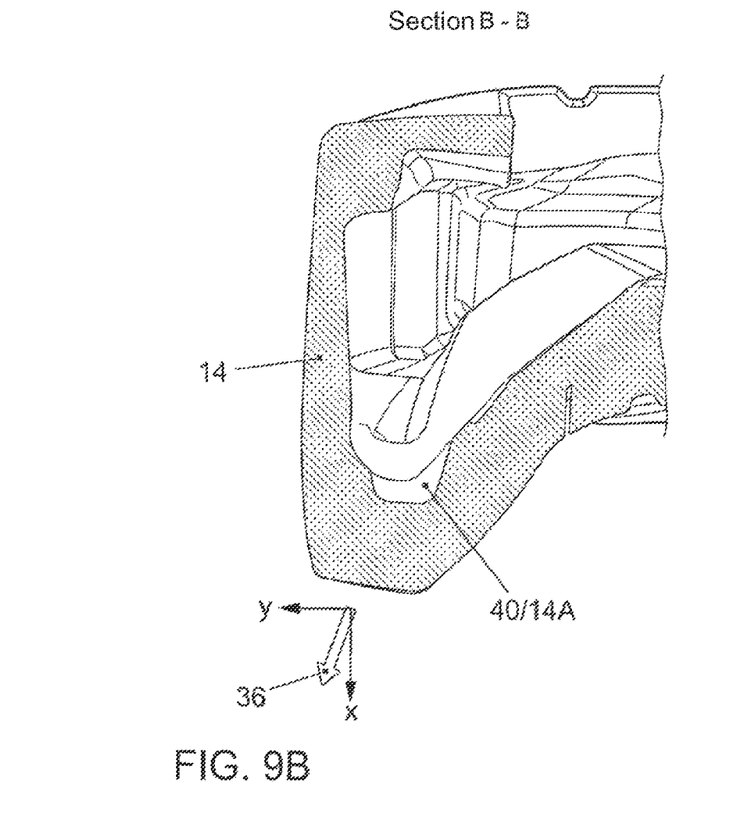

FIG. 9A indicates the development of foam groove 14A on the basis of sectional line B-B, which follows the position of the angularly arranged foam groove 14A, and the associated sectional view from FIG. 9B. As shown in FIG. 9B, this represents a crescent-like notch/recess 40 in the region of foam part 14. The groove height h is approximately 1.8 mm for example and, depending on the foam thickness of foam part 14, may of course also be introduced into foam part 14, as required, in a thicker or thinner or deeper or less deep fashion.

List of Reference Characters
10 vehicle component (seatback)
12 support structure (seatback frame)
14 foam part (seatback foam part)
14A foam groove
16 installation space
18 cover
20 weakening
22 lateral impact airbag module (soft cover)
22-1 first embodiment variant of 22
22-2 second embodiment variant of 22
24 fastening device
26 lumbar adjustment device
28 opening for operating element of lumbar adjustment device
30 fleece
32 perforation
34 slotted segment
34A short slot
34B long slot
36 direction of inflation of airbag of airbag module
38 distance
40 notch/recess
h height of foam groove

What is claimed is:

1. An airbag module arrangement, comprising:
an airbag module arranged on a vehicle component, the airbag module including an airbag carrier, an airbag, and a gas generator jointly attached to a support structure in an installation space of the vehicle component, from which the airbag exits in response to a triggering and subsequently opens at least one material layer including a foam part and a fleece layer situated over the airbag module and inflates in a passenger compartment;
wherein the installation space of the airbag module is surrounded by the foam part that is closed at least in a direction of inflation, and the fleece layer is situated on an inner side of the foam part at least in a desired exit region of the airbag module from the foam part; and
wherein the fleece layer has a specifiable perforation in the desired exit region of the airbag module; and
wherein the foam part includes a slotted and/or pre-slotted segment, a position of the slotted and/or pre-slotted segment adjusted to and/or corresponding to the perforation of the fleece layer, wherein the slotted and/or pre-slotted segment includes a plurality of slots.

2. The airbag module arrangement according to claim 1, wherein the vehicle component includes a seatback.

3. The airbag module arrangement according to claim 1, wherein the airbag module is arranged as a lateral impact airbag module, the airbag being fastened on the airbag carrier by a retaining strap and kept in the installation space.

4. The airbag module arrangement according to claim 3, wherein the lateral airbag module is fastened by the airbag carrier on the support structure.

5. The airbag module arrangement according to claim 4, wherein the support structure includes a seatback frame.

6. The airbag module arrangement according to claim 1, wherein the perforation is arranged on an inner side of the fleece layer.

7. The airbag module arrangement according to claim 1, wherein the fleece layer is mounted to the foam part upon foaming of the foam part.

8. The airbag module arrangement according to claim 1, wherein the perforation extends in a z direction substantially orthogonally to the direction of inflation of the airbag of the airbag module.

9. The airbag module arrangement according to claim 1, wherein the perforation in the fleece layer is arranged in a slotted and/or hole-perforated manner.

10. The airbag module arrangement according to claim 1, wherein the perforation is formed by slotting and/or hole-perforating the fleece layer according to a specifiable pattern.

11. The airbag module arrangement according to claim 10, wherein a length of the slotted and/or hole-perforated regions of the fleece layer increases from top to bottom in a perforation extending in the z direction.

12. The airbag module arrangement according to claim 11, wherein the length of the slotted and/or hole-perforated regions of the fleece layer is between 10 and 22 mm and/or 30 to 50 mm.

13. The airbag module arrangement according to claim 10, wherein distances between the slotted and/or hole-perforated regions of the fleece layer decrease from top to bottom in a perforation extending in the z direction.

14. The airbag module arrangement according to claim 12, wherein a distance between the slotted and/or hole-perforated regions of the fleece layer is between 2 and 15 mm.

15. The airbag module arrangement according to claim 1, wherein the fleece layer is adapted to hold the foam of the foam part together in the exit region of the airbag module while preventing creation of individual foam particles of the foam.

16. The airbag module arrangement according to claim 1, wherein the at least one material layer further comprises a cover, the cover surrounding the foam part has a weakening, a position of the weakening adjusted to and/or corresponding to the perforation of the fleece layer.

17. The airbag module arrangement according to claim 1, wherein the perforation extending in a z direction in a transition region of the foam part is provided from an inner contour extending substantially in an x direction to an inner contour extending substantially in a y direction such that a direction of inflation is disposed at an angle forward in the x direction between the x and y directions for lateral protection of a vehicle occupant.

18. The airbag module arrangement according to claim 17, wherein the direction of inflation corresponds to a direction of a hip region of an occupant.

19. The airbag module arrangement according to claim 1, wherein a fleece thickness of the fleece layer is approximately $(280+/-50)$ g/m$^2$.

20. The airbag module arrangement according to claim 1, wherein the fleece layer is made of PET (polyethylene terephthalate) and/or PP (polypropylene).

21. The airbag module arrangement according to claim 1, wherein the foam part has on an inner side a foam groove adapted to provide a defined tearing of the foam part when the airbag of the airbag module exits.

22. The airbag module arrangement according to claim 21, wherein the foam groove is introduced into the foam part at a specifiable foam groove height in a crescent manner and with respect to its depth, relative to a thickness of the foam part in the exit region of the airbag module, and is oriented in a specifiable direction depending on the desired direction of inflation for a lateral protection of a vehicle occupant at an angle forward in an x direction, between x and y directions.

23. The airbag module arrangement according to claim 21, wherein the direction of inflation corresponds to a direction of a hip region of the vehicle occupant.

* * * * *